(12) United States Patent
Kashti

(10) Patent No.: US 7,047,216 B2
(45) Date of Patent: May 16, 2006

(54) CUSTOMER INTERFACE UNIT

(76) Inventor: Amatsia Kashti, 4 Home Farm Barn, Thrupp Lane, Radley, Abingdon, OX14 3NG (GB)

( * ) Notice: Subject to any disclaimer, the term of this patent is extended or adjusted under 35 U.S.C. 154(b) by 614 days.

(21) Appl. No.: 09/682,357

(22) Filed: Aug. 24, 2001

(65) Prior Publication Data

US 2002/0046197 A1    Apr. 18, 2002

(30) Foreign Application Priority Data

Feb. 26, 1999  (GB) .................................. 9904316.8

(51) Int. Cl.
*G06F 17/60*   (2006.01)

(52) U.S. Cl. .......................... 705/35; 705/26; 705/412; 705/400; 705/401; 702/61; 702/62; 709/224

(58) Field of Classification Search ................ 705/412, 705/26, 35, 63, 400; 702/61, 62; 709/224
See application file for complete search history.

(56) References Cited

U.S. PATENT DOCUMENTS

| | | | | |
|---|---|---|---|---|
| 6,088,688 A | * | 7/2000 | Crooks et al. | ............... 705/412 |
| 6,553,418 B1 | * | 4/2003 | Collins et al. | ............... 709/224 |
| 6,618,709 B1 | * | 9/2003 | Sneeringer | ................... 705/412 |

* cited by examiner

*Primary Examiner*—Firmin Backer
*Assistant Examiner*—Daniel L. Greene
(74) *Attorney, Agent, or Firm*—Ronald E. Smith; Smith & Hopen, P.A.

(57) ABSTRACT

The invention relates to a system which allows information to be transmitted from one or a number of utility providers to one of a number of customers, and vice versa. The information is received and accessible at the customer's premises via a display screen and user selection means connected to the system. In another feature the system allows the consumption of a utility in the premises to be collated and profiles created and utility usage to be allocated to the usage of specific apparatus in the premises.

13 Claims, 10 Drawing Sheets

CUSTOMER INTERFACE UNIT

BACKGROUND OF INVENTION

The invention to which this application relates is a customer interface unit for use in premises and for use to provide various services to a customer such as a resident of said premises and particularly although not exclusively, is a unit for use in conjunction with metering facilities for the consumption of at least one of the utilities of electricity, gas, water and telephone.

A utility consumption, measuring system is described in the Applicant's co-pending European Patent Application No. EP0834849 and in this application there is disclosed a system which comprises a utility metering apparatus in a premises and from which the meter information is transferred into digital form and then transmitted to a remote location to a utility provider to allow the metering information to be received and processed and/or also to a television or home computer or monitor in the metering apparatus within the premises to allow the occupier of the premises to view the meter information.

It has now been found that further advantages can be provided to the occupier of the premises, both in the presentation of the information and the utilisation of the information to provide further data and it is an aim of the invention to provide a interface unit and system which allows the utility provider and utility user to be able to communicate to the mutual benefit of both.

SUMMARY OF INVENTION

In a first aspect of the invention there is provided a system for the transfer of data and information between a utility provider and a customer and vice versa, and wherein said system includes a means for transmitting information between the utility provider to the premises of the customer or user and said information is viewable and/or retrievable in the premises via a supplied monitor, homecomputer, television or any other display and said customer or user is capable of responding via a keyboard or other selection means to allow the customer to select a response to the information received.

In one embodiment, the information which is transmitted to and received at the premises is a visual image which can be any of billing details, advertisements, internet sites or the like and may also include an audio transmission. In one embodiment the advertisements may relate to the utility provider and indicate the range of services which that utility provider can offer to the customer of the premises and this may therefore negate the need to provide additional leaflets or literature as is commonly the case when the utility bill is currently posted to the customer.

In a further embodiment, the information which is transmitted to the customer at the premises relates to information which requires a response from the customer. The information may be any of a series of questions such as to allow the change of a service or utility provider by the customer or may for example relate to opinion poli questions and it is envisaged that there will be provision of a keyboard or other means which allows a customer to select a response to the questions which are raised.

In one embodiment the information is received by apparatus which can be provided by the utility provider to the customer as part of the metering apparatus or as a separate device and in one embodiment the device includes a keyboard or a series of buttons which allow the customer to execute commands such as changing utility supplier without the need of any further instruction or procedures. The customer can secure the actions by inputting a code to verify that they are indeed authorized to perform such transaction. It is also preferred that the devices are simple to useand therefore the occupier does not require knowledge in computing and/or computer operations.

In an additional feature, the system may provide an ability to selectively, automatically, operate control means for the control of the utility within the premises such as, for example, a means for controlling the heating of water, a system to allow the control of the heating within the premises or any other function or systems within the premises which can usefully be controlled, and which typically relates to usage of the utility.

In a yet further feature of the invention, it is envisaged that the system may be adapted for use by persons with physical and/or mental disabilities and for example, may include an integrated voice processor which will allow people with vision disabilities to hear the information which appears on the screen of the monitor being read and therefore allows the same to make choices by voice rather than selecting or pressing buttons.

In a further aspect of the invention there is provided a system for metering the use of a plurality of utilities in a premises, said system allowing the reading and logging of information from all, or a combination, of utility meters in the premises so as to provide a record of utility usage in any given time period.

It is envisaged that utilities of water, gas, electricity, heating, telephone, internet usage and any other utility which uses a supply or can be charged on a time basis can be monitored.

In one embodiment of the invention, the monitoring data can be obtained at pre-designated intervals of usage of the utility such as for example at intervals of every 30 seconds and longer or, alternatively, continuous monitoring.

It is envisaged that the intervals of reading and logging utility usage can be determined on a utility by utility basis so that for example it may be sufficient to monitor electricity usage in terms of minute intervals whereas telephone usage may be monitored in terms of second intervals, and so on.

In a further feature of the invention profiles of utility usage can be generated to indicate the malfunctioning of any apparatus and the cross referencing of the same so that, for example, a product or apparatus which uses more than one utility can be identified, such as a washing machine or dishwasher which use both water utility and electricity utility. By the appropriate programming of the system, the system can identify use of particular devices within the premises at any given time by profiling and analyzing the utility usage at that time.

In a yet further embodiment, and by relatively detailed monitoring and profiling of utility usage, the system distinguishes between different brands of the same product and apparatus and/or can define and distinguish the age of the apparatus.

In a yet further aspect of the invention there is provided a system for the transfer of data and information between a utility provider and a customer and vice versa, and wherein said system includes a means for transmitting information between the utility provider and the premises of the customer and said information is viewable and/or retrievable in the premises via a supplied monitor, home computer, television or any other display.

The ability to profile and monitor utility usage enables utility and virtual utility providers to provide cost packages and cost offers for their utility which can be tailored to the type of premises, the number of occupiers of the premises, the age of the occupiers of the premises, the apparatus used in the premises, frequency of use and so on.

It is envisaged that in one embodiment the monitoring systems and the corresponding metering devices will be incorporated in the premises free of charge and the information provided by the said system can be sold to any utility provider which the occupier of the premises wishes to be associated. In one embodiment this can be a number of utility providers who are pre-designated in the system and which can be activated by the occupier.

BRIEF DESCRIPTION OF DRAWINGS

A specific embodiment of the invention will now be described with reference to the accompanying drawings, wherein.

DETAILED DESCRIPTION

Figure 1:
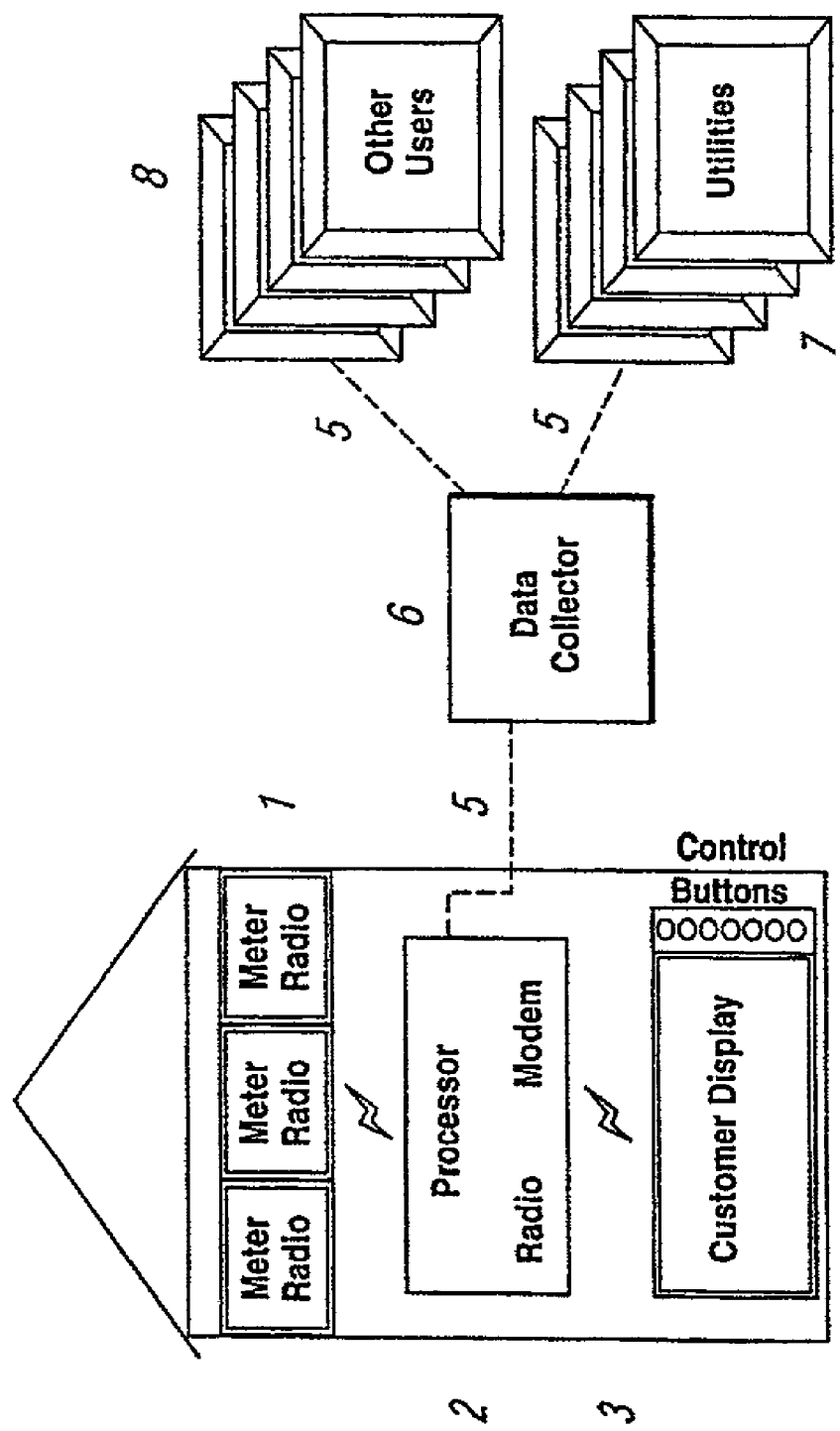
FIG. 1 illustrates an arrangement according to one embodiment of the invention.

Referring now to FIG. 1, there is shown the provision of a metering means 1 which can be for any of gas, electricity, water or any other utility or apparatus which may require to be metered. The reading from the meter is transmitted via a radio receiver which is within the meter to a radio receiver. The radio receiver is provided with a microprocessor unit 2 which allows the transmission and reception of information relating to the utility meter readings to a remote location 7 to allow further processing of the readings. Information received from the remote locations 7 and 8 may relate to billing information, changes in the price of the utility provided but may also additionally relate to the provision of information relating to other services which any commercial body, related to the utilities or not related to them, at the discretion of the service provider 6, may be able to offer to the customer and/or may also relate to information relating to special offers, means by which the customer may reduce their bills and so on. Thus the system can be used as an advertising medium for the utility provider and advertising for any party who may wish to provide information.

The information sent by "no-ring" telephone lines indicated by 5 from the remote location 6 can be viewed by the customer via a display screen 3 which can be any of a television, computer terminal or specially provided monitor as part of the metering apparatus.

Further information may also be transmitted from another remote location or locations indicated by 8 via 6 and said additional information can relate to internet sites, television images, audio images or may relate to other information in the form of questions to the consumer for the purposes of opinion polls. The consumer can be provided with a means which may be a terminal, voice activation means or the like which allow the consumer to select one of a range of options or to reply in general to questions which are received from the remote location.

A further feature of the invention is that there is provided additional control means 4 which can be operated by the consumer to control various functions of the premises. For example the control means may include a thermostat system which generates a display on the monitor and which, by use of the control means, the consumer may control the setting of the thermostat and hence control the heat within the premises. It will be appreciated that any function which is currently controlled separately by the consumer in a premises may all be provided within the control box so as to allow a single point of control by the consumer via the monitor and control means therefor.

Figure 2:
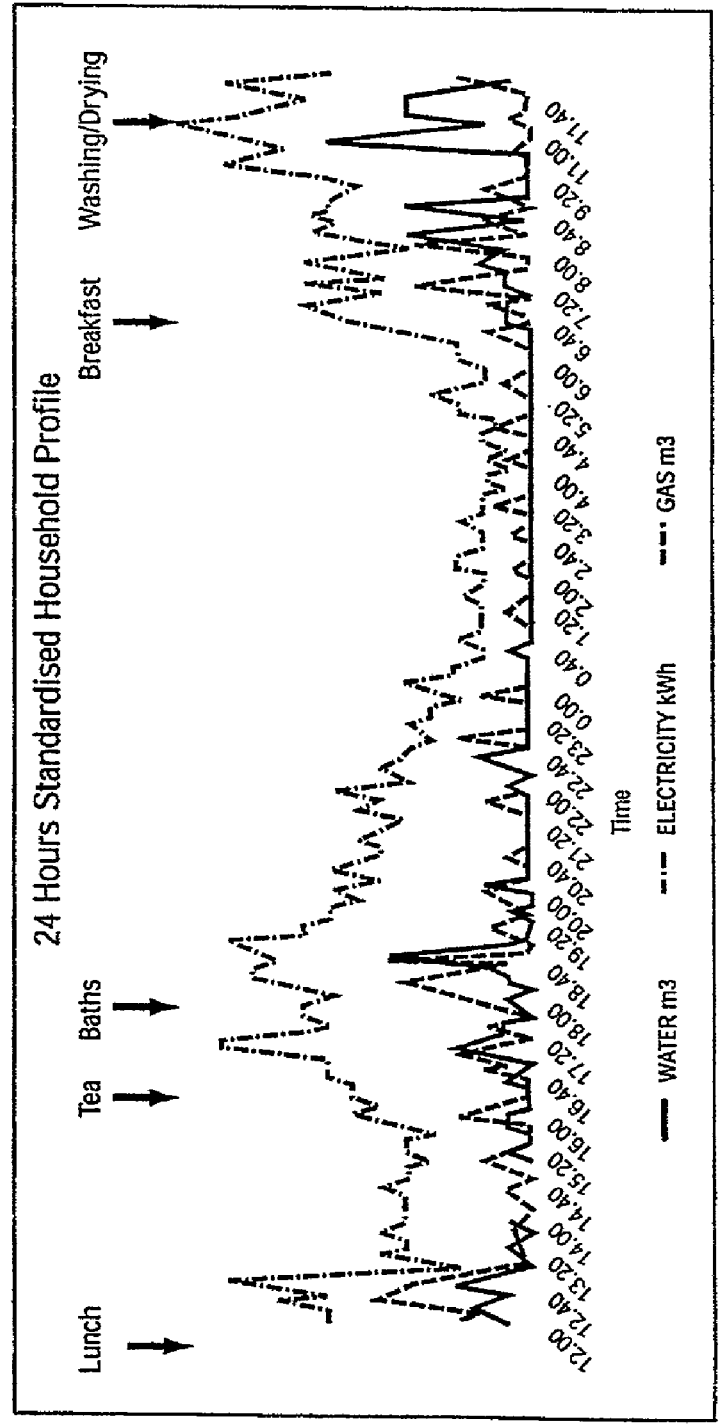
FIG. 2 illustrates a utility usage profile according to a further embodiment of the invention.
Figure 3:
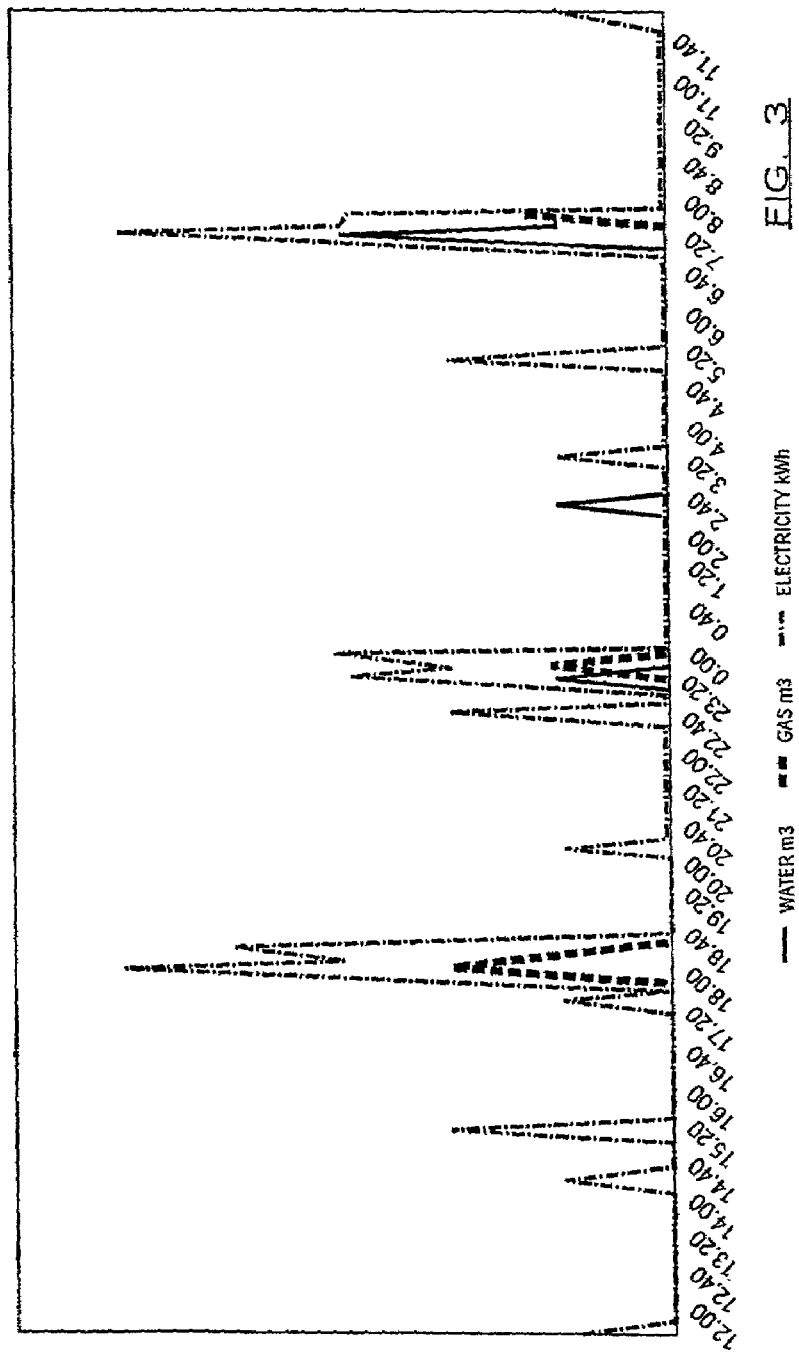
FIG. 3 illustrates a utility usage profile according to a further embodiment of the invention.

FIGS. 2 and 3 illustrate a further aspect of the invention which relates to the monitoring and profiling of utility usage within a premises. The FIG. 2 illustrates a utility usage profile for a relatively large family of two adults and three children and illustrates a monitoring interval of 10 minutes. FIG. 3 shows a profile generated for a single person. The profiling of utilities can be achieved by monitoring usage of each of a number of utilities within the premises and in this case is shown water, electricity and gas. The analysis of the profile for a particular utility indicates the level and peak usage of the utility over a period of time, such as 24 hours and then over repeated time intervals to allow a pattern of usage to be constructed over a longer period of time such as a week, month, etc. Thus, the information obtained for a particular utility in isolation is of use to that utility provider and the analysis of utility profiles with respect to one another is also of advantage as it can be used to indicate, with prior knowledge, the usage of particular types of apparatus such as for example dishwashers,washing machines where both water and electricity utilities are used, cookers where both gas and electricity utilities may be used, and so on, so that after a relatively short period of time, the analysis of the utility user profiles can be used to quite distinctly mark out the usage of different types of apparatus. With more detailed and shorter interval monitoring, it is even possible to distinguish between specific brands of the same apparatus and also the age of the said apparatus with reference to previously known apparatus usage profiles. With this relatively detailed information, it is possible for the utility providers to generate a package of utility costs which would be particularly attractive to certain types of household such that for example if one compares FIGS. 2 and 3 it will be seen that electricity usage in FIG. 2 peaks for a longer period of time at tea time and bath time and also for washing and drying in comparison with FIG. 3 for a single person where there may be the same peaks but the same are relatively short. Thus, if a utility provider wished to be particularly attractive to a single person he may offer electricity at a very cheap price for a longer period of time during the day as they can tell that utility usage during the day is almost negligible whereas they may not be so willing to provide the same cheap price for FIG. 2 where it can be seen that utility usage, particularly for electricity, is relatively high throughout the day and in this instance the electricity provider may therefore offer a package where the prices are not as low as those offered to the single person of FIG. 3 but are perhaps lower in average for continued use. Thus it will be appreciated that the utility provider and range of providers can tailor a package to suit specific premises and occupiers of the premises and that the consumer, via the system as described in this invention, can select the utility provider which they wish to use and can also change utility providers relatively easily over relatively short periods of time in response to specific packages, offers, etc.

FIGS. 4A–G illustrate displays which can be generated using the apparatus and system of the invention. In this example each of the displays generated relates to billing information directed towards a specific utility user 20 and viewable only by that user upon entering a suitable password for example. The display is generated by the provider of the utility and transmitted, using the system of the invention, to the utility user. The user then has the opportunity to interact with the utility provider to select options of payment by touching the selection means 22. The options which are available are indicated by the utility provider on the display screen 3, such as method of payment, amount to be paid and so on.

Figure 4A:
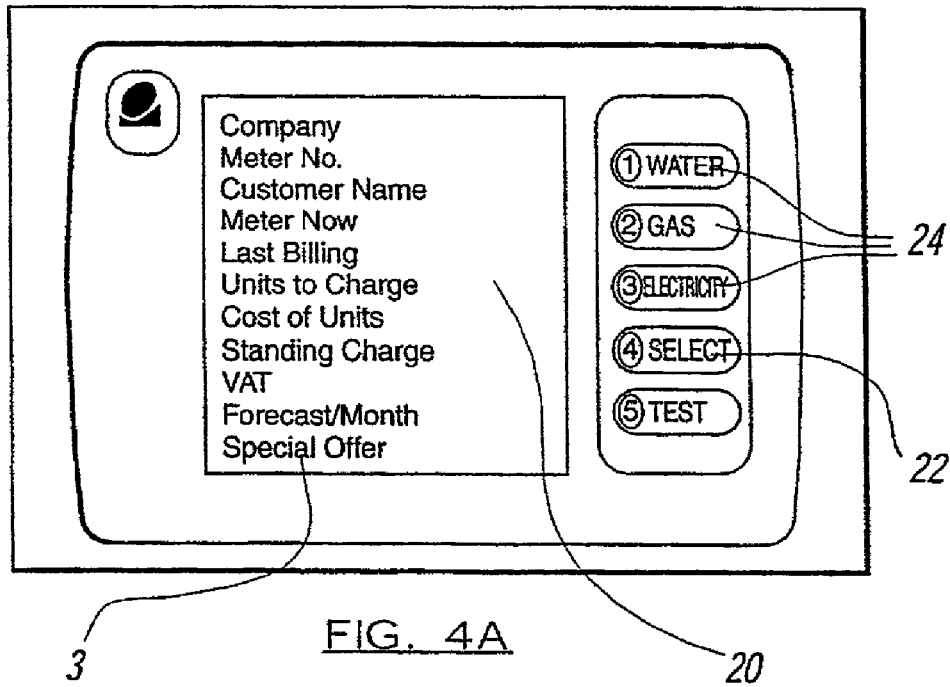
FIGS. 4A–G illustrate on screen displays generated with respect to billing information generated by the utility provider for the utility user.
Figure 4B:
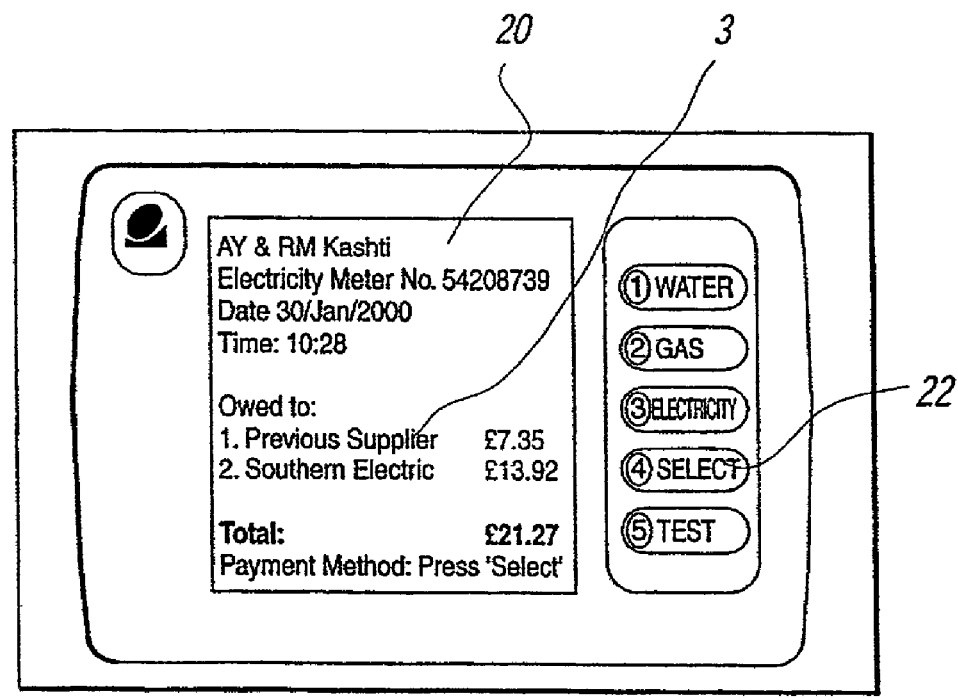
Figure 4C:
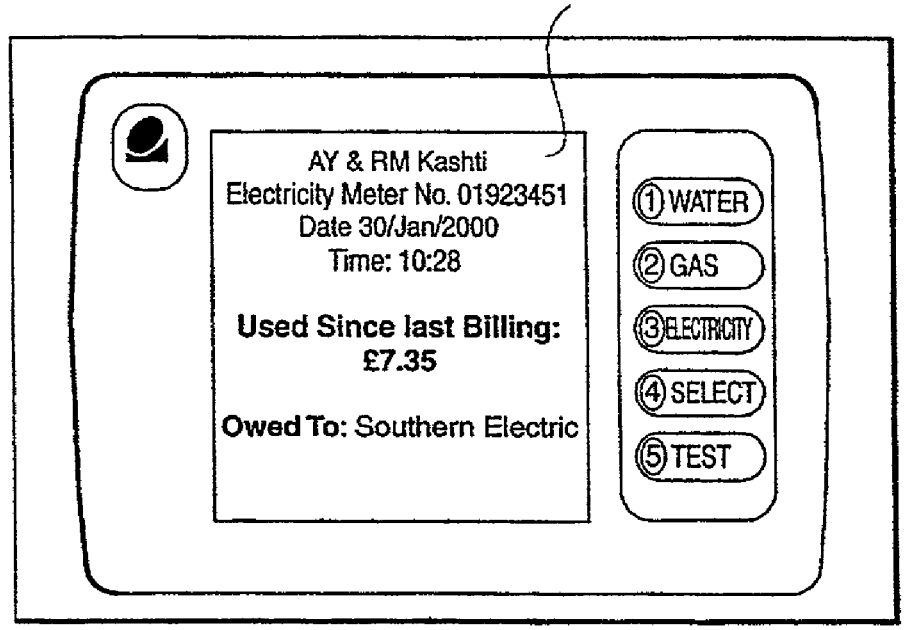

In the embodiment shown other selection means 24 are provided which allow the user to select to obtain information from utility providers of water, gas, electric and other selection means can be provided as required. The use of these selection means enables the utility user or customer to make a connection with the utility provider and/or memory means provided with the display means to access information relating to consumption, billing and the like of the selected utility and so it will be readily appreciated that the system in accordance with the invention allows two way communication between selected utility providers and specific utility users. Looking at each of the displays FIG. 4A illustrates a display of the utility details which are of relevance to the user such as historical billing information, charging tariffs and so on. FIG. 4B illustrates a bill of the amount due to the utility provider of electricity at the time and also indicates an amount outstanding to a previously selected provider of the electricity utility and so it will be appreciated how the system of the invention facilitates the switching and selecting of different providers of the utility. FIG. 4C is a further display which provides to the user an indication of the amount due since the last billing.

Figure 4D:
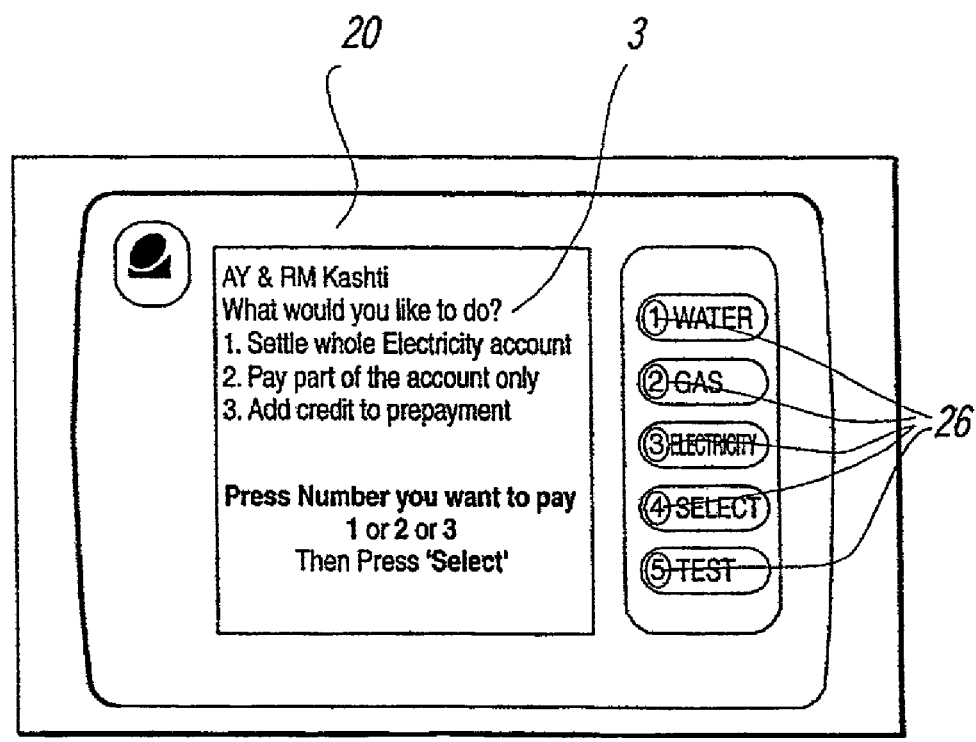
Figure 4F:
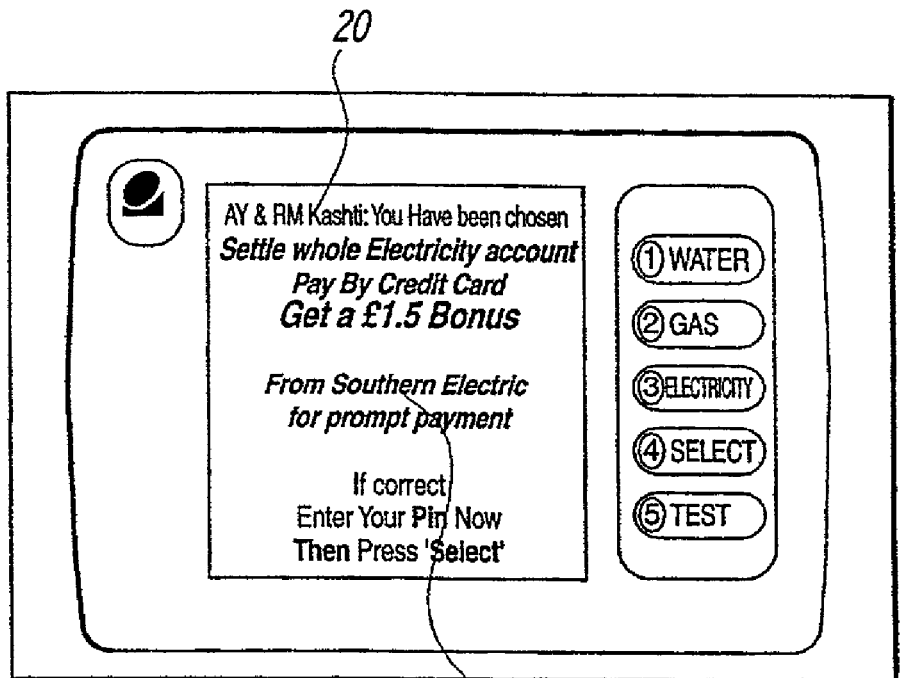
Figure 4E:
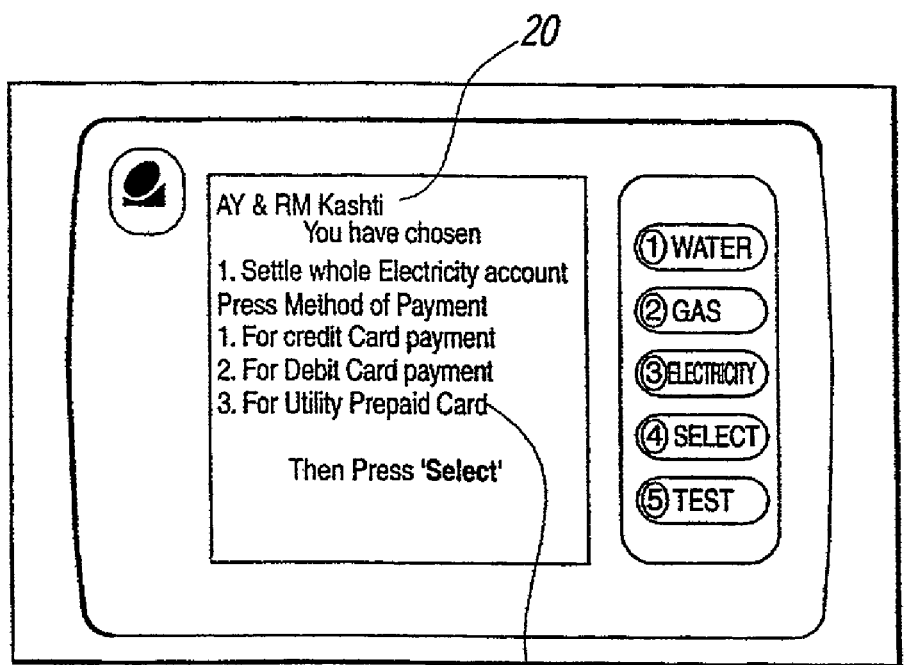
Figure 4G:
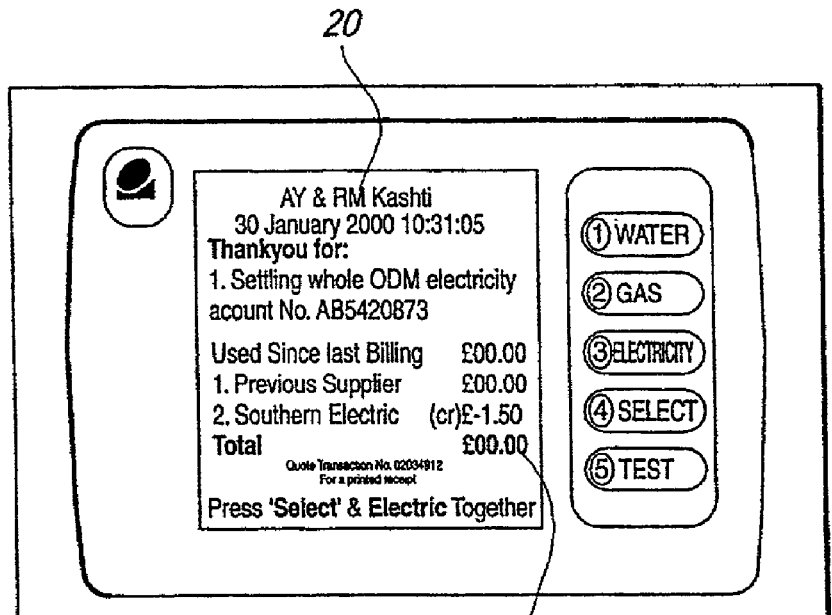
Figure 5A:
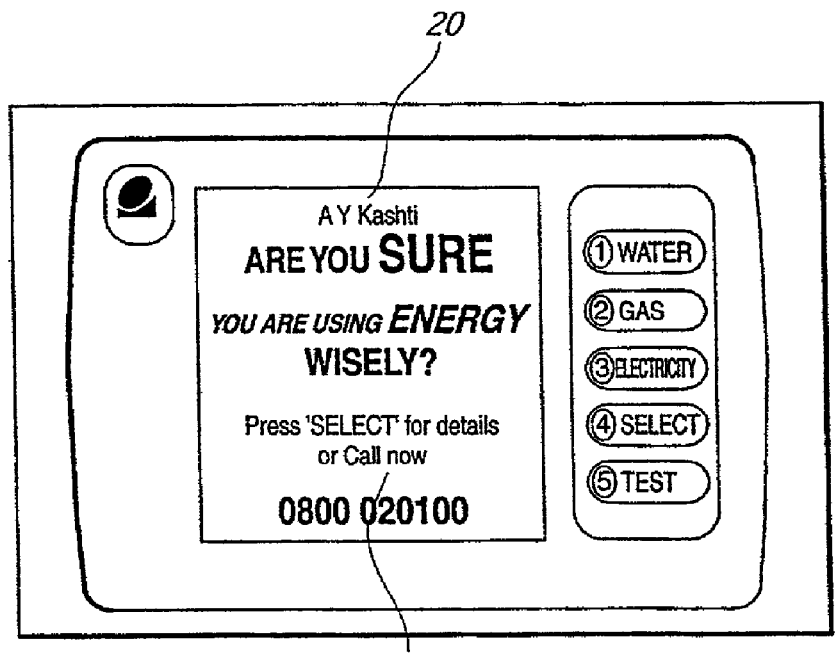
FIGS. 5A–D illustrate on screen displays of utility usage information generated with respect to specific utility users.
Figure 5B:
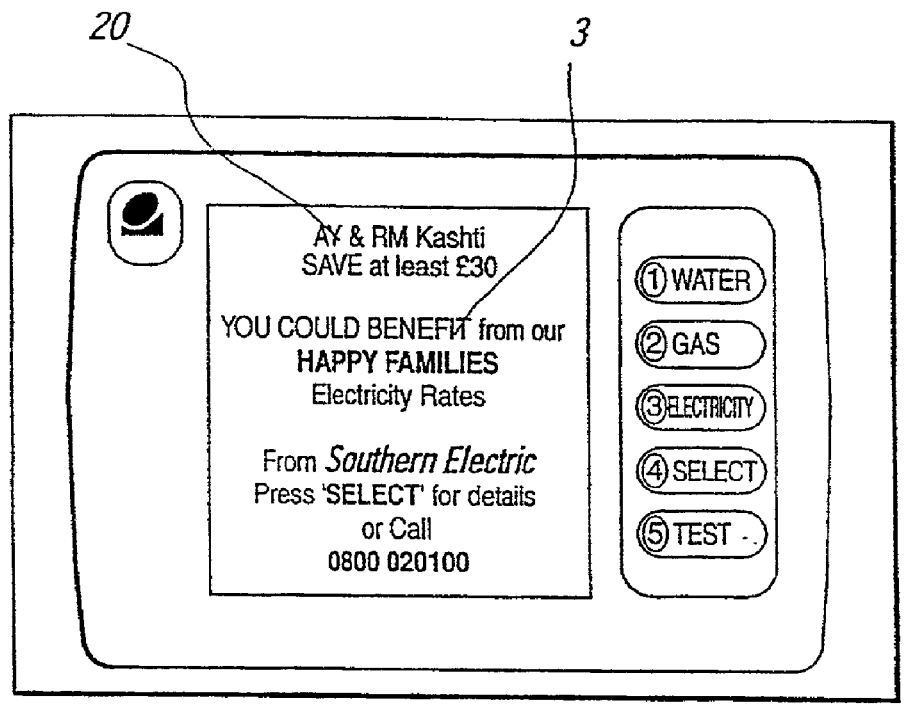
Figure 5C:
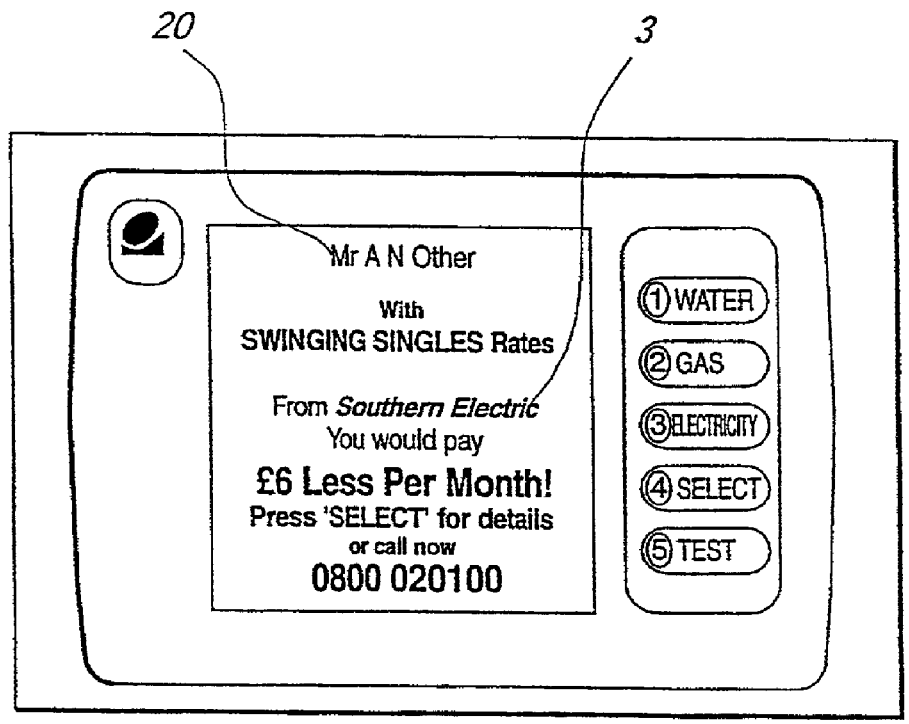
Figure 5D:
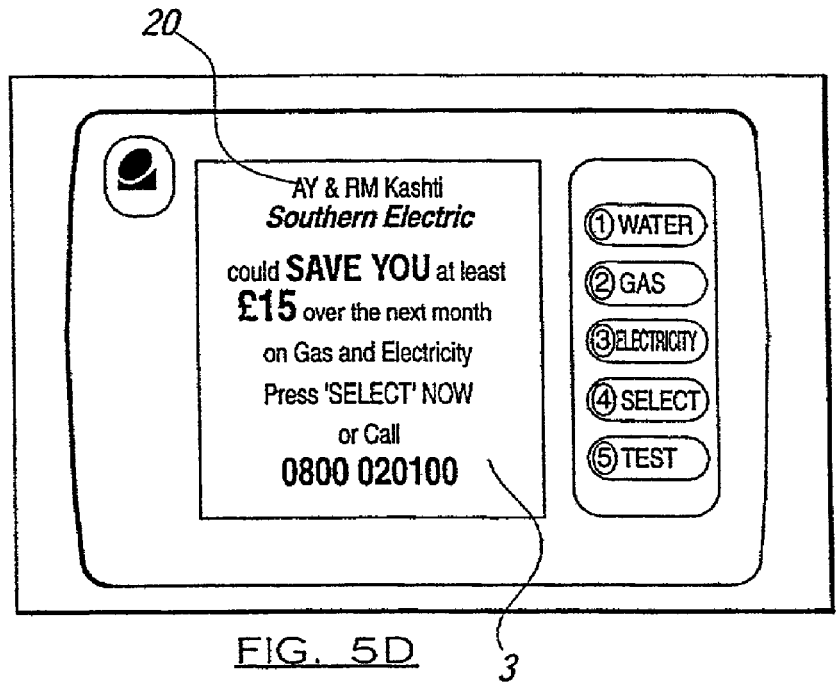

In FIG. 4B the display allows the user to choose the method of payment by using the select button 22 and FIG. 4D illustrates the display which can be generated and which indicates the range of options available. Upon selecting the appropriate numbered selection means 26 the display of FIG. 4E is generated to mirror the users intention to pay the whole account and a range of payment methods is displayed for selection by selecting appropriate selection means 26. When the appropriate selection is made the display of FIG. 4F is generated which acknowledges the payment details and also includes promotional material. FIG. 4G illustrates in effect the receipt of payment and allows the user the option to print off a receipt of payment using appropriate printing apparatus.

FIGS. 5A–5D each illustrate a display screen 3 with selection means as discussed with respect to FIGS. 4A–G. They also illustrate how the utility provider can transmit promotional material for display to specific users and which material is generated with reference to information obtained from the users utility system with respect to usage etc. Thus the utility provider can identify and calculate tariff schemes that are best suited for the user based on that users historical consumption of the utility and send details on said schemes to the user for their consideration. The calculations can be based on the information received as set out with respect to FIGS. 2 and 3. If the user wishes to take up any of the said offers they can do so by using the selection means.

Figure 6A:
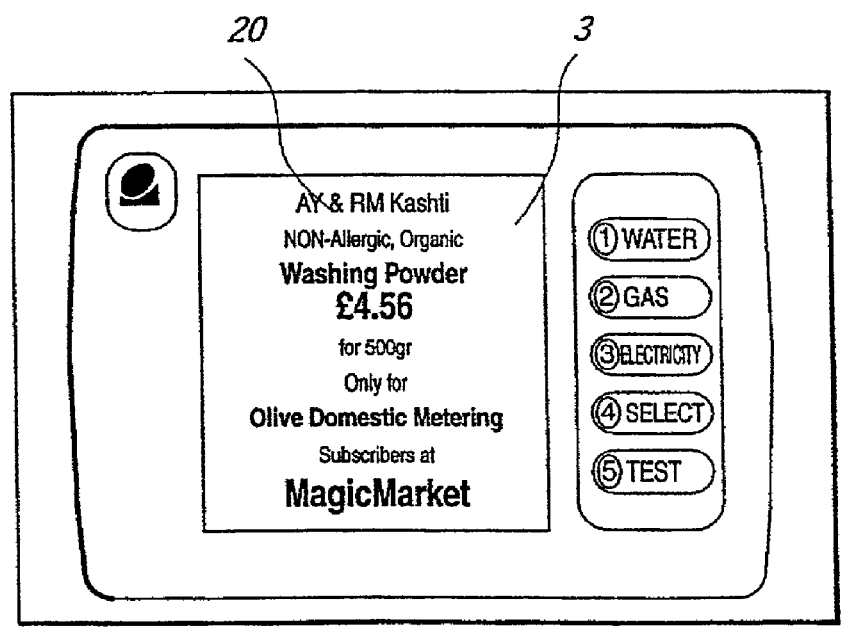
FIGS. 6A–B illustrate on screen displays generated to advertise product offers for customers of the utility provider.
Figure 6B:
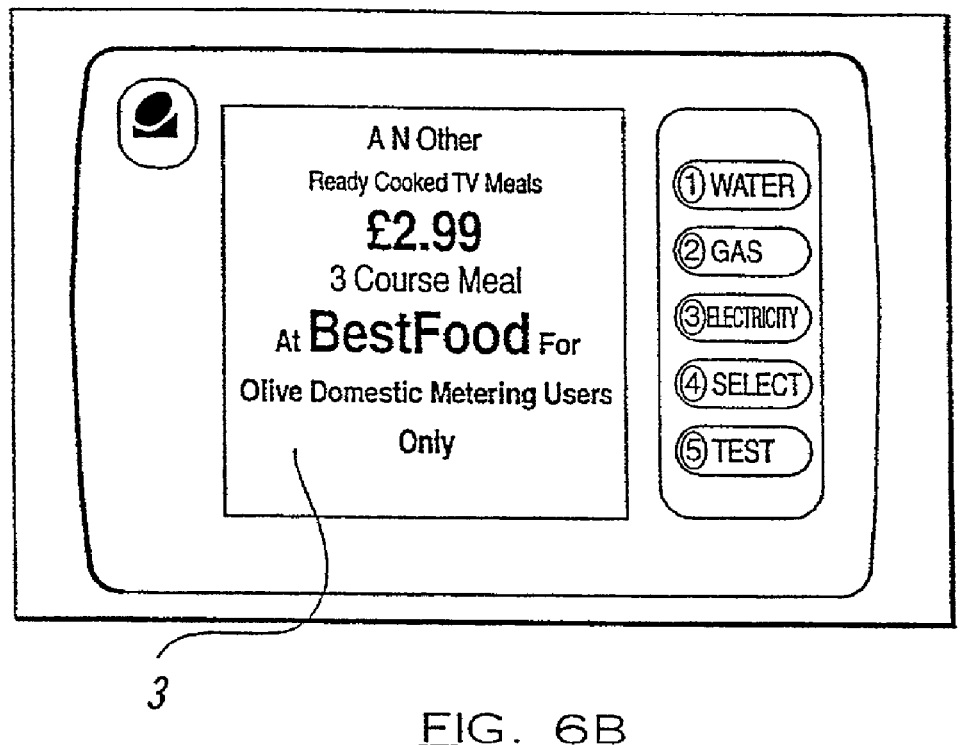

Turning to FIGS. 6A and B there is illustrated a yet further feature in which in addition to promotional material being transmitted for display by the utility providers themselves they may make available the system to allow other companies to transmit promotional material relating to a range of products for display to users. FIGS. 6A and B illustrate two examples of this.

Thus it is envisaged that the present invention provides increased use and functionality of an existing system and as such makes the use of the system more beneficial and reduces the need or other control systems to be provided within the premises.

The invention claimed is:

1. A method for the mutual transfer of data and information between a provider of water, gas, electricity, heating, telephone, Internet usage, and other household utilities and a family including at least one person, comprising the steps of providing a list of providers of said household utilities, transmitting information between each provider on said list of providers and a household of the family, providing display means in the household of the family for displaying such information from each provider, such display means being provided in the form of a monitor, home computer, or television, and providing selection means so tat said at least one person is capable of responding via said selection means by selecting a response to the information received and said response including a control signal allowing said at least one person to control the provision of a household utility from the household of the family.

2. The method of claim 1, further comprising the step of providing information received by the family from a provider that relates to the metering of the consumption of the household utility or a plurality of household utilities.

3. The method of claim 1, further comprising the step of allowing said at least one person of said family to obtain entry into the selection means-by the introduction of a coded input.

4. The method of claim 1, further comprising the step of allowing the at least one person to selectively operate said selection means for the controlled household utility within the household.

5. The method of claim 1, further comprising the step of making the display means a part of a household utility consumption metering apparatus in the household.

6. The method of claim 1, further comprising the steps of transmitting information from the at least one person to a provider, said information relating to metering of the use of at least one household utility in the household, and allowing the reading and logging of information from at least one metering apparatus in the household to provide a record of household utility usage in any given time period to the provider.

7. The method of claim 6, further comprising the step of making the information accessible by the at least one person who, on the basis of information received from the provider, sends a command to one of a plurality of providers to receive said household utility from a selected provider.

8. A method for metering the use of one or a plurality of household utilities in a household, comprising the steps of reading and logging information from at least one metering apparatus in the household to provide, to a provider of water, electricity, gas, Internet usage, and other household utilities, a record, as utility usage profiles, of household utility usage in any given time period, said information being accessible by at least one person in a family accessing said information via a monitor, home computer, television, or other display means, providing communication means to allow said at least one person to selectively transmit data via the communication means and receive communication from one or more providers, and further allowing said at least one person, on the basis of information received from one or more providers, to send a command via said communication means to one of a plurality of providers to designate said family to receive said utility from a selected provider and said selected provider generates at least some of the information on the basis of household utility usage profiles transmitted by the family to the provider.

9. The method of claim 8, further comprising the step of monitoring data of the usage of the utility or utilities at pre-designated time intervals of usage of the utility or utilities.

10. The method of claim 8, further comprising the step of generating at least one profile of usage for usage of each household utility, based upon monitoring the usage of utilities, to allow subsequent setting of utility usage and supply.

11. The method of claim 8, further comprising the step of allocating utility usage data to the usage of apparatus within the household.

12. The method of claim 11, further comprising the step of allocating the usage of a plurality of household utilities over the same time period to the usage of specified apparatus within the household.

13. The method of claim 8, further comprising the step of providing the information received by the apparatus to the family, said information relating to the household utility usage profile information previously transmitted to the provider by the family.

* * * * *